US012273778B2

United States Patent
Yang et al.

(10) Patent No.: US 12,273,778 B2
(45) Date of Patent: Apr. 8, 2025

(54) PRIMARY CELL SWITCHING IN CARRIER AGGREGATION

(71) Applicant: AT&T Intellectual Property I, L.P., Atlanta, GA (US)

(72) Inventors: Wen Yang, Bellevue, WA (US); Hongyan Lei, Plano, TX (US); Ye Chen, Marietta, GA (US); Yupeng Jia, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 365 days.

(21) Appl. No.: 17/809,728

(22) Filed: Jun. 29, 2022

(65) Prior Publication Data

US 2024/0007912 A1    Jan. 4, 2024

(51) Int. Cl.
*H04W 36/00* (2009.01)
*H04W 16/14* (2009.01)
*H04W 36/30* (2009.01)

(52) U.S. Cl.
CPC ....... *H04W 36/0069* (2018.08); *H04W 16/14* (2013.01); *H04W 36/0085* (2018.08); *H04W 36/30* (2013.01)

(58) Field of Classification Search
CPC ............. H04W 36/0069; H04W 16/14; H04W 36/0085; H04W 36/30; H04W 48/20; H04L 5/001; H04L 5/0058
See application file for complete search history.

(56) References Cited

U.S. PATENT DOCUMENTS

| | | | | |
|---|---|---|---|---|
| 2016/0050647 A1* | 2/2016 | Hwang | ................. | H04W 28/20 370/329 |
| 2017/0135005 A1* | 5/2017 | Basu Mallick | ....... | H04W 36/04 |
| 2018/0338335 A1* | 11/2018 | Mukherjee | .............. | H04L 5/001 |
| 2021/0076270 A1* | 3/2021 | Sreenivasa | ............ | H04W 48/20 |
| 2022/0007261 A1* | 1/2022 | Kim | ..................... | H04B 7/0695 |

* cited by examiner

*Primary Examiner* — Dady Chery

(74) *Attorney, Agent, or Firm* — Guntin & Gust, PLC; Miyoung Shin

(57) ABSTRACT

The disclosed technology is directed towards switching the primary cell in a carrier aggregation scenario to improve performance. Measurement data of a mobile device (user equipment) is evaluated with respect to one or more various criteria such as cell carrier bandwidth, cell carrier load, cell-related capability and other carrier data (e.g., dynamic spectrum sharing versus clean, time division duplex or frequency division duplex), and others. Device conditions such as overheating can be considered as well. The evaluation results in a ranking of primary cell candidates. If a more optimal primary cell (candidate) is available, the primary cell in the carrier aggregation combination is switched to the candidate that is ranked the highest. Switching can be relatively very fast, such as based on already existing layer-1 (L1) and/or layer-2 (L2) measurement data. Layer-3 (L3) measurement data also can be obtained on demand, for example, to use in the evaluation.

20 Claims, 10 Drawing Sheets

PRIMARY CELL SWITCHING IN CARRIER AGGREGATION

TECHNICAL FIELD

The subject application relates to mobile communications devices in general, and more particularly to the selection of a primary cell for mobile device communications, and related embodiments.

BACKGROUND

User equipment can be configured for new radio (NR, e.g., fifth generation or 5G) carrier aggregation, including with mixed frequency division duplex and time division duplex (TDD) carriers. A frequency division duplex (FDD) carrier can be a clean NR carrier or a dynamic spectrum sharing (DSS, shared with LTE) NR carrier.

Selection of the primary cell (PCell) in carrier aggregation can impact the overall carrier aggregation performance. Selecting one PCell can result in lower user throughput and/or longer latency, either or both of which can degrade a user experience relative to selection of a different PCell.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
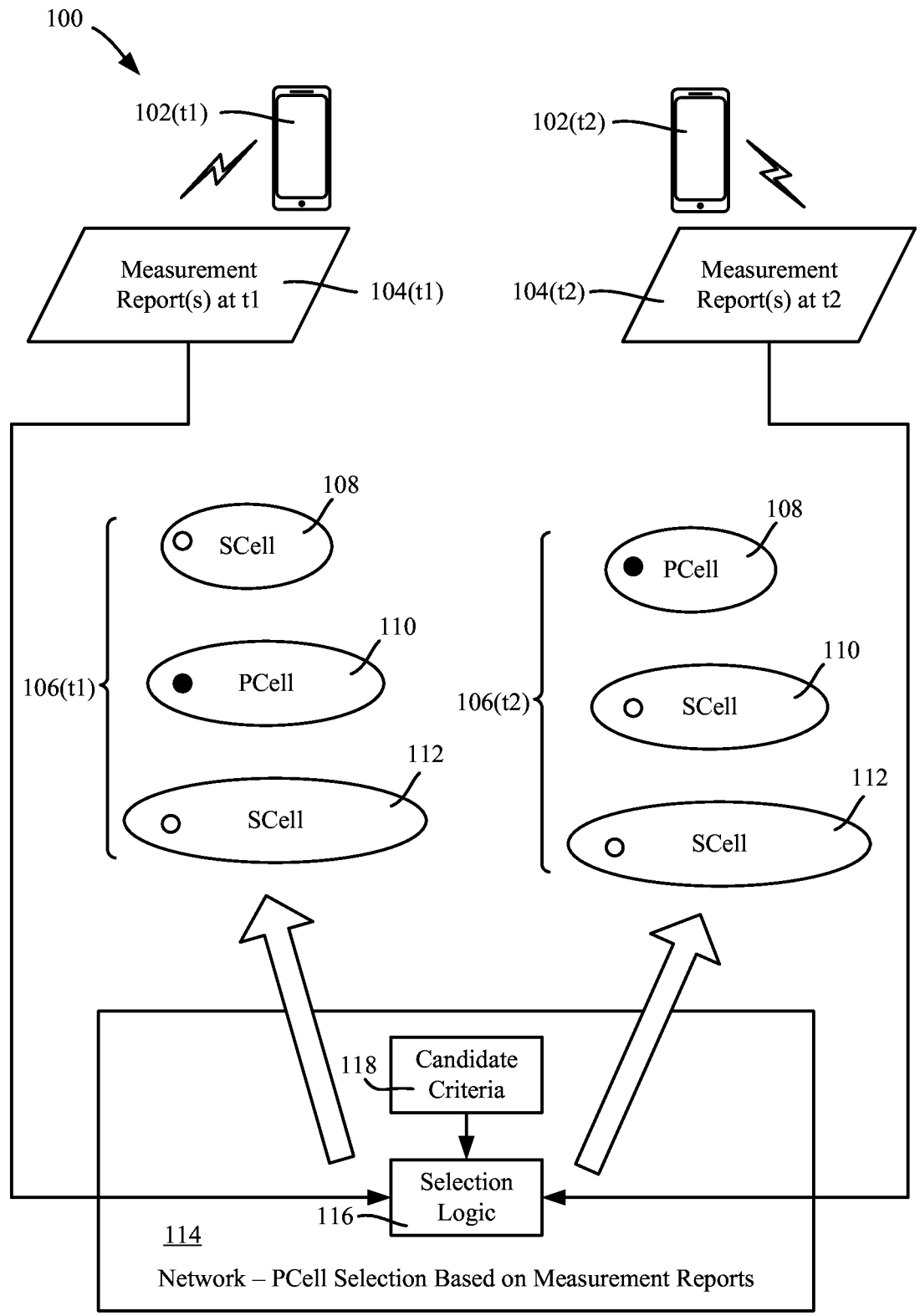
FIG. 1 is a block diagram of an example system in which a network selects a primary cell (PCell) for mobile device carrier aggregation based on measurement reports from a mobile device, in accordance with various aspects and embodiments of the subject disclosure.

The technology described herein is generally directed towards improving new radio (including 5G) carrier aggregation performance by selecting a more optimal primary cell (PCell) for a user equipment device, including with mixes of frequency division duplex (FDD) and time division duplex (TDD) carriers. To select and switch to a more optimal PCell, ideally the most optimal of those available among candidate PCells, various criteria of candidate criteria can be considered, including, but not limited to the bandwidth of a candidate carrier, (noting that typically TDD has more bandwidth). Typically the carrier with larger bandwidth is selected as the PCell.

Other non-limiting criteria can include whether a carrier is a dynamic spectrum sharing (DSS) carrier being shared with LTE or is a clean (non-DSS) carrier, the current load on a carrier, whether the carrier is (user equipment and radio) TDD with sounding reference signal (SRS) switching support, massive multiple-input, multiple output (mMIMO) antenna availability, transport-related data, the user equipment's uplink and/or downlink application (data needs), whether the user equipment may be in an overheating condition, and the current RF conditions measured for that carrier. Any or all of the criteria may be considered individually or in any combination(s)/permutation(s), including with respect to some non-limiting examples described herein.

As used in this disclosure, in some embodiments, the terms "component," "system" and the like are intended to refer to, or include, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "gNode B (gNB)," "evolved Node B (eNode B)," "home Node B (HNB)" and the like, can be utilized interchangeably in the application, and can refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "user equipment," "device," "communication device," "mobile device," "subscriber," "customer entity," "consumer," "customer entity," "entity" and the like may be employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, including, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.11 wireless technologies and/or legacy telecommunication technologies.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

FIG. 1 shows a general communications system 100 in which user equipment 102 also referred to herein as a mobile device or user equipment device or UE) sends measurement reports 104 to a network node at different times, t1 and t2. This is represented in FIG. 1 by UE 102(*t*1), UE 102(*t*2), and measurement reports 104(*t*1), 104(*t*2), referring to times t1 and t2, respectively.

In general network operators use a mix of 5G FDD and 5G TDD spectrum for 5G standalone downlink carrier aggregation and non-standalone ENDC (E-UTRAN New Radio—Dual Connectivity) with carrier aggregation. A typical scenario is to use 5G TDD FR1 carrier bandwidth (40-100 MHz) and FR2 (100 MHz minimum) carrier bandwidth; this is much larger than 5G FDD FR1 FDD (5-20 MHz).

A throughput performance issue has been observed in practice when using FDD (smaller bandwidth) as the PCell and TDD (larger bandwidth) as SCell; indeed, approximately over a 30 percent impact has been noted (with a 10-15 percent impact resulting from the SCell limitation on the TDD sounding reference signal switching feature). For example, the use of reciprocity-based beamforming in good to medium channel conditions can provide better downlink throughput and capacity compared to codebook-based transmission for UEs that support SRS. The SRS transmitted by the UE is the basis for channel estimation that can be used to determine the beamforming weights of downlink transmission. Further, a coverage performance issue has been observed in practice when using TDD as PCell and FDD as SCell, as a TDD carrier is uplink limited compared to an FDD carrier.

The channel state information feedback (CSF) measurement reports include data for the PCell (e.g., carrier ID 0) and SCells (carrier IDs 1 and 2) in the carrier aggregation combination. Each CSF report includes rank indicator (RI) data, precoding matrix indicator (PMI) data, and channel quality indicator (CQI) data. There can be layer-1 (L1, physical layer) reports, layer-2 (L2, medium access control (MAC), radio link control (RLC), packet data convergence protocol (PDCP) layer) reports, and layer-3 (L3, radio resource control (RRC) layer) reports. Via these measurement reports, the network obtains feedback data such as CQI data, RI data, MAC data, radio link control block error rate (RCL BLER) feedback data, power headroom report (PHR) data, close loop power control information, uplink signal-to-noise (SNR) estimates, and so on. Such measurement reporting can be aperiodic and/or periodic.

For purposes of this example, consider that the mobile device 102 is moving or otherwise experiencing different radio and other e.g., carrier load) conditions at time t1 with respect to its configured carrier aggregation cells 106(*t*1). The state of the cells 106(*t*1), at and after time (t1) until changed, is represented in FIG. 1 by the secondary cell (SCell) 108, the primary cell (PCell, also indicated by the darkened dot within) 110 and the secondary cell 112, relative to the state of the carrier aggregation cells as represented at 106(*t*2).

As can be seen in this example, the technology described herein in the network 114 includes selection logic 116, which, based on one or more candidate criteria 118 (examples are described herein), switches the primary cell to the cell carrier 108 from the cell carrier 110. This is depicted in FIG. 1 by the arrow between the selection logic 116 and the cell group 106(*t*2) to emphasize switching of the primary cell to the cell carrier 108 as described herein. The state of the primary and secondary cell arrangement 106(*t*2), at and after time (*t*2) until changed, is represented in FIG. 1 by the primary cell (PCell, also indicated by the darkened dot within) having been switched to the cell 108, the secondary cell 110 (switched from having been the primary cell at *t*1), and the secondary cell 112.

In general and as described herein, the technology in the selection logic 116 includes logic/intelligence (e.g., in the gNB) to select and move the UE to a more optimal PCell and use the best carrier aggregation combination configuration to obtain performance improvement. Among many examples described herein, this can be based on RF conditions, throughput performance potential, coverage extension potential and/or load and capacity condition data. The technology facilitates doing mobility between different carriers based on previously configured carrier aggregation combination, within the same site. The technology provides for a fast mobility decision within the same site with same carrier aggregation combination based on L2 measurement, instead of relying on explicit L3 based UE measurement reporting. Notwithstanding, as described herein, if an L2 measurement is not available, additional/ad hoc L3 measurement can be triggered by the network to the UE before a handover.

Figure 2:
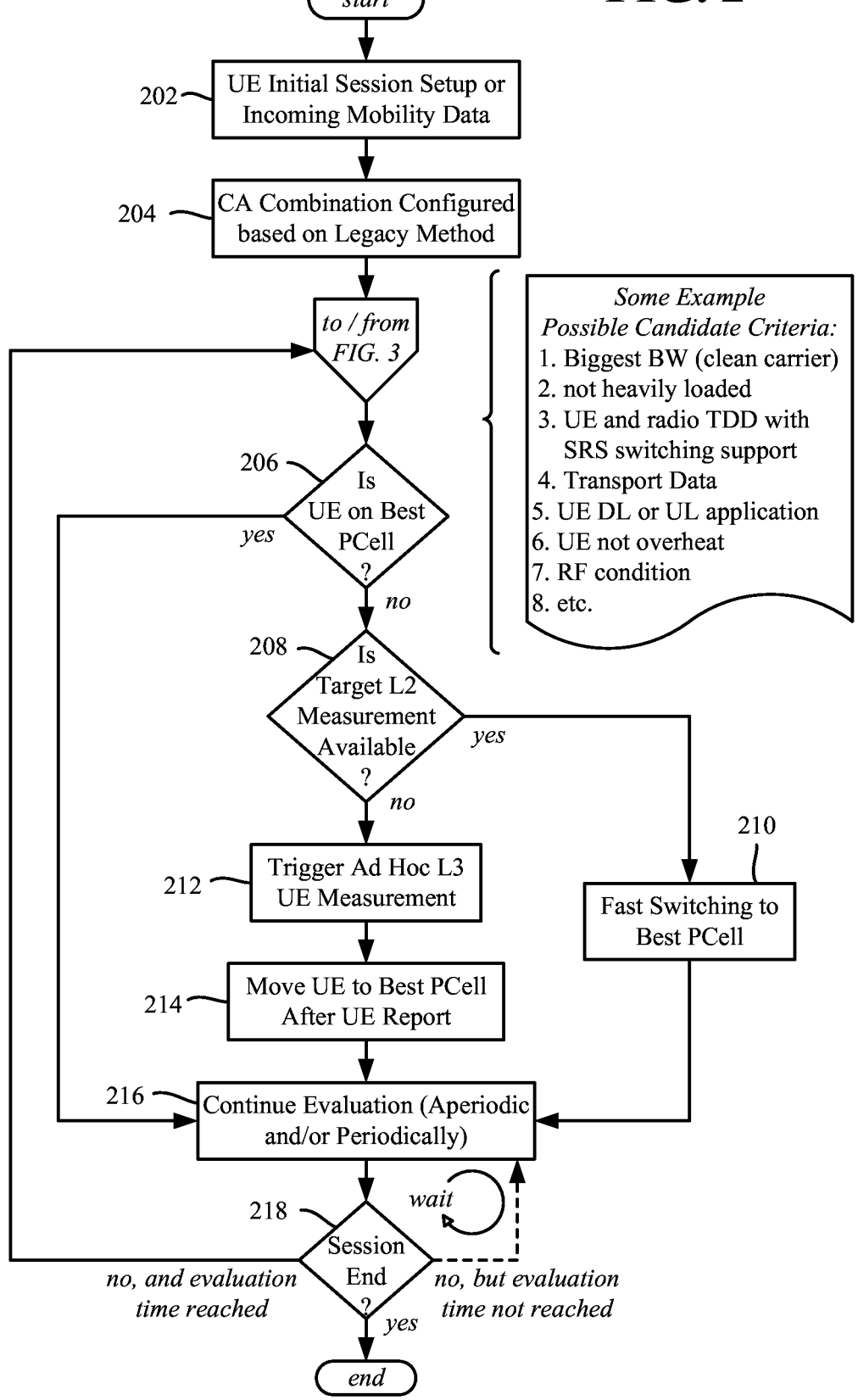
FIG. 2 is a flow diagram representing example operations for selecting a primary cell for carrier aggregation, in accordance with various aspects and embodiments of the subject disclosure.

FIG. 2 is a flow diagram representing example operations of the selection logic 116 of FIG. 1, based on various example criteria 118. Operation 202 represents the UE initial session setup or other incoming mobility data (e.g., obtained following handover) by which carrier aggregation is configured. Operation 204 represents the carrier aggregation combination, such as based on the legacy method. As described herein, there may be a more optimal carrier aggregation combination configuration, which will be determined via operation 206 following candidate PCell ranking (FIG. 3).

Figure 3:
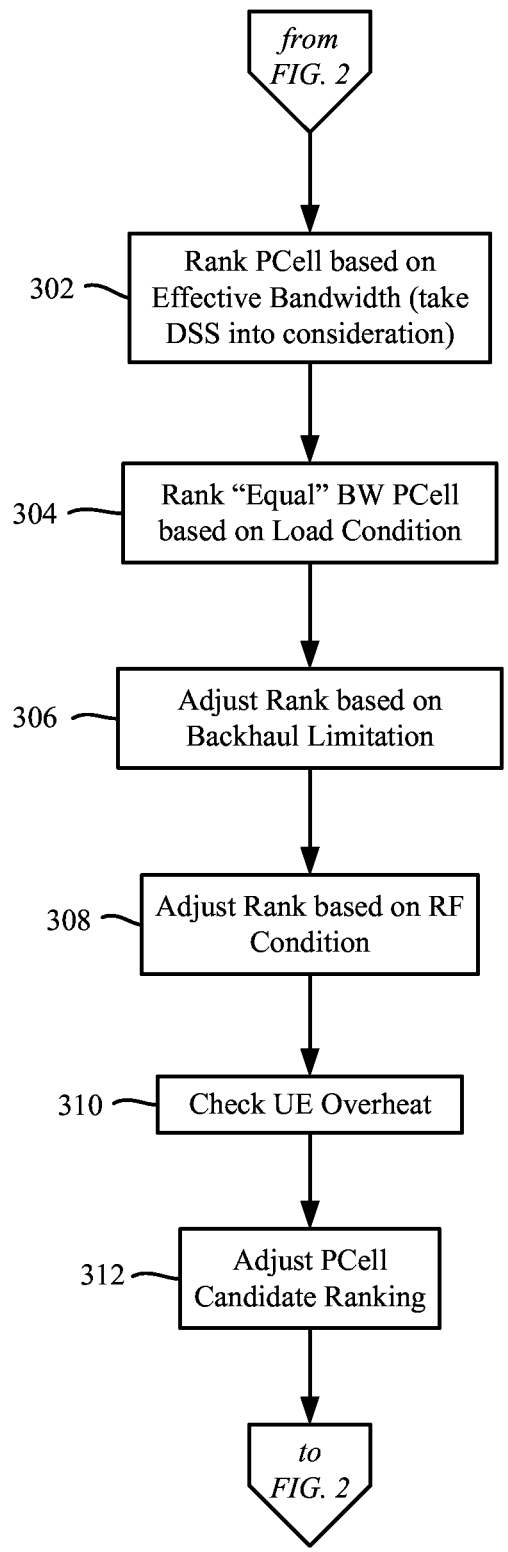
FIG. 3 is a flow diagram representing example operations that can be used to select a primary cell for carrier aggregation from among primary cell candidates based on various criteria, in accordance with various aspects and embodiments of the subject disclosure.

It is emphasized that there are any number of ways to rank candidate PCells, and FIG. 3 is but one non-limiting possible example of such ranking for purposes of explanation. Indeed, the order of operations can be varied, one or more of the example criteria can be added or omitted, and other criteria not described may be used. Further, a scoring system that accumulates (adds or subtracts weighted points or the like) for each PCell candidate based on each (e.g., weighted) criterion may be implemented in a straightforward way, and can be adjusted/learned/improved over time. The term "ranking" as used herein can be by preference ordering/reordering, by scoring, or by any other system that ultimately favors one PCell candidate over one or more others. Note that the current PCell can be a candidate PCell, e.g., with a rank order or score, as it is possible this is the most optimal PCell candidate of those available.

In any event, in this example operation 302 represents ranking the preferences among available PCell candidate carriers based on effective bandwidth, which in this example takes DSS versus clean carrier state into consideration. For example, carrier aggregation UE performance can be adversely impacted if the PCell carrier has less bandwidth than that of another carrier available to be a PCell; e.g., a 5 MHz FDD carrier may be being used as the PCell while there is another TDD carrier with 40 MHz available. Thus, the PCell can be moved to the carrier with larger bandwidth, in this case after considering DSS, which if present, can reduce the effective bandwidth.

By way of example, a comparison among clean carriers (or DSS carriers) can be ranked so that the carrier with the most bandwidth is preferred. Note that equal bandwidth carriers results in a tie, move to step 2. What is considered "equal" can be within a threshold value, e.g., two carriers close in bandwidth may be considered a tie, with a further tiebreaker applied to select one over the other. Further, a carrier aggregation combination with more maximum aggregated bandwidth can be selected. As set forth herein, DSS carriers (or not) are considered as a factor. For example, when comparing a DSS carrier to a clean carrier, unless the DSS carrier has x percent more bandwidth (where x can be learned, performance measured, etc.) than the clean carrier, (e.g. 20 MHz DSS versus 5 Mhz clean), the DSS carrier will have less preference.

Operation 304 represents ranking equal (or sufficiently close) bandwidth PCells based on their respective load conditions. This can change the ranking that was determined at step 302. Based on the prior ranking, operation 304 checks the loading difference for ties (equal or deemed sufficiently) close in bandwidth. If the currently preferred carrier loading exceeds some certain threshold (is y percent more loaded than the next preferred carrier), then the ordering is switch. Otherwise the same ordering is kept, continuation to operation 306 in this example.

Operation 306 represents potentially readjusting the candidate rankings based on backhaul link limitation data. For the current ranking following step 304, if everything is still tied (equal or sufficiently close) for the top two or more candidates, if one of the candidate has less backhaul speed (e.g. 1 Gbps), the candidate with the higher transport speed is moved ahead of it in the rankings. For example, a PCell may be using a carrier with a suboptimal transport link, such as only 1 Gpbs, whereby switching to another carrier available for the PCell with a better transport link (e.g. 10 Gbps) may be more beneficial in terms of performance.

Operation 308 represents potentially readjusting the candidate rankings based on the TDD versus FDD and current RF conditions as most recently measured and reported. Based on the ranking from the prior operations, if everything is considered still tied, or a TDD carrier has more bandwidth, and the RF condition is adequate for TDD, remain with TDD as the leading pCell candidate, otherwise the ranking can be readjusted. For example, a carrier with better RF conditions can be selected over another carrier. The uplink signal strength of the carrier can be considered; the gNB has the direct information on the uplink signal strength and quality, and can thus select an uplink carrier that has sufficiently good signal quality.

Further, if the UE is overheated (operation 310), it is desirable to change to use a smaller bandwidth FDD as the PCell, or remove all SCells, which is generally represented via operation 312, for example. For example, a device may be in overheating situation and needs to remove a TDD carrier from carrier aggregation; (the TDD carrier can be either a PCell or an SCell).

Thus, in this example the effective bandwidth considers the DSS offset. Note that the order of the operations to finalize each PCell candidate ranking can change based on RAN vendor implementation; FIG. 3 is only one example.

Further, although not explicitly shown in FIG. 3, the order of the operations to finalize each PCell candidate ranking can be dynamically changed based on the UE's application, a change of the cell loading, a change of the RF conditions, and so forth. As such, the PCell evaluation is conducted periodically and/or on demand/aperiodically, as the device may be moving, loading can be changing, RF conditions can change, and so forth. The PCell may be changing during each evaluation considering any or all of the aforementioned factors, as well as others.

By way of other examples, the advanced technology availability (e.g. MIMO) for a candidate carrier (e.g. mMIMO with beamforming is typically available at TDD carrier and not available at FDD carrier) can result in selecting the carrier supporting advanced technology.

Thus, the technology favors not using a heavily loaded carrier as the PCell when another carrier with similar bandwidth, but less loading, is available, using a similar bandwidth/transport and loading carrier with better RF conditions as the PCell instead of an otherwise similar carrier with lesser RF conditions, and/or not continuing to use a carrier having a limited number of carrier aggregation combination (e.g. total aggregated bandwidth) when another carrier is available. A DSS carrier shared between LTE and NR as the PCell may not perform as well as another NR clean carrier with similar bandwidth that is available as a PCell. A TDD carrier with a similar amount of bandwidth that supports mMIMO can be selected as the PCell over an FDD carrier that does not support mMIMO, resulting in improved performance.

Selection according to any of these example PCell selection scenarios or a combination of the scenarios (as well as others) can cause more optimal carrier aggregation performance. Indeed, there are scenarios in which where multiple factors are considered in an evaluation at the same time, with the optimal PCell chosen based on the combination of those multiple factors. Notwithstanding, the bandwidth and loading are likely the more significant criteria.

Returning to FIG. 2, operation 206 represents evaluating whether the UE is on the "best" PCell, that is, the carrier aggregation combination is more optimal than any other as described herein. The preference ordering (or a scoring system) can be accessed to determine if the current PCell is the highest ranked, or needs to be changed for likely more optimal performance. If already the "best" PCell, operation 206 branches to operation 216 to await the next evaluation (unless the session ends first, as evaluated at operation 218). Note that whether the current PCell is considered already "best" can be based on being sufficiently close, such as avoiding the overhead of switching (and possibly avoiding an L3 measurement as described with reference to operation 212) for what will only be a very small likely performance improvement.

If a more optimal (e.g., higher ranked) PCell candidate is available, operation 206 branches to operation 208, which represents evaluating whether a target layer-2 (L2) measurement (e.g., including channel state data) is already available (e.g., from the usual UE measurements/reports; L1 measurements are already required to be returned frequently). Often there is an L2 measurement available, whereby relatively highly fast switching to the higher ranked PCell candidate is performed, without needing another measurement) resulting in moving the best available PCell candidate to become the current PCell in the carrier aggregation combination configuration. After this, operation 216 represents awaiting the next evaluation (unless the session ends first, as evaluated at operation 218).

If no L2 measurement is available, operation 212 represents triggering an ad hoc layer-3 (L3) UE measurement. Based on the L3 UE measurement, operation 214 represents moving the UE to the best PCell based on UE's L3 measurement report. Thereafter, operation 216 represents continuing the evaluation on an aperiodic and/or periodic basis; an aperiodic evaluation interval time can be based on the speed at which the UE is moving (if at all), for example, if the load of the PCell carrier changes significantly, and/or if the UE data needs are changing. Note that operation 218 evaluates whether the session ends during the timeframe between evaluations (as represented by the generally circular "wait" arrow; if so, in this example no further evaluation is performed until a next session begins.

Figure 4:
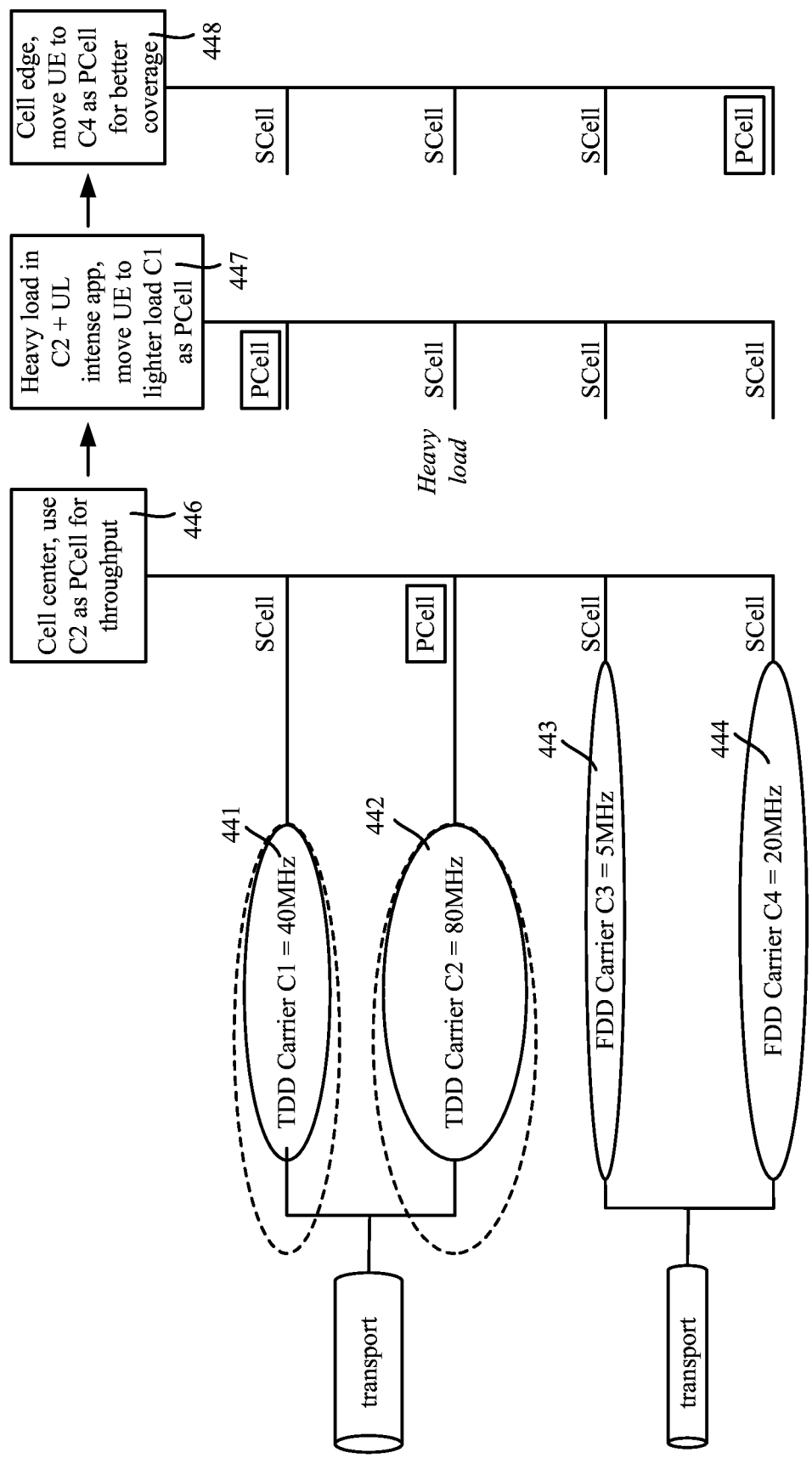
FIG. 4 is a representation of how a primary cell can be changed over time for more optimal user equipment performance with respect to carrier aggregation, in accordance with various aspects and embodiments of the subject disclosure.

FIG. 4 shows an example of more optimal PCell selection from a mobile deice among a mix FDD and TDD NR carriers C1-C4 (labeled 441-444, respectively), including how the PCell may be changed after evaluations considering the aforementioned factors/criterion, e.g., as the device may be moving, loading may be changing, etc. Note that moving UE from one PCell to another PCell triggers inter-frequency measurements for RSRP, RSRQ, SINR; after UE sends a measurement report, the gNB can trigger mobility based on events, e.g., event A2 (serving worse than threshold), event A3 (neighbor becomes offset better), event A5 (SpCell becomes worse than threshold1 and neighbor becomes better than threshold2). Note that frequent inter-frequency measurement impacts UE battery life, retainability and throughput performance. There is also a longer cycle of time to trigger and signaling processing time, more signaling messages. Further note that moving a PCell within the same carrier aggregation combination can take use of the L1 report. L2 UE feedback data can be obtained on an aperiodic and/or periodic basis. RI, PMI and CQI are included in the CSF reports, configured aperiodic and/or periodic, with relatively high frequently (20 ms) and accuracy.

In the example of FIG. 4, in a first state represented by block 446, a mobile device/UE is located near the center of a cell. As a result, based on the measurements, carrier C2 (442) is selected as the PCell for more optimal throughput.

In a second state represented by block 447, the mobile device (possibly still located near the center of the cell), the carrier C2 is experiencing heavy loading (e.g., over some threshold load value/percentage z), and the mobile device is running (based on data usage, buffer thresholds, etc.) an uplink intense application. As a result, carrier C1 (441) is selected and moved to become the PCell for the mobile device, based on a lighter load on the carrier C1 (441). Note that even though in this example the bandwidth of carrier C2 (442) of 80 MHz is greater than the bandwidth of carrier C1 (441) of 40 MHz, the combination of heavy PCell carrier loading plus the UE uplink data needs results in the carrier C1 (441) becoming the pCell. As described herein, there are many ways that the criteria can be evaluated to result in a different PCell being selected for switching thereto.

In a third state represented by block 448, the mobile device/UE is located near the cell edge. As a result, based on updated measurements, carrier C4 (444) is selected as the PCell for better coverage.

Figure 5:
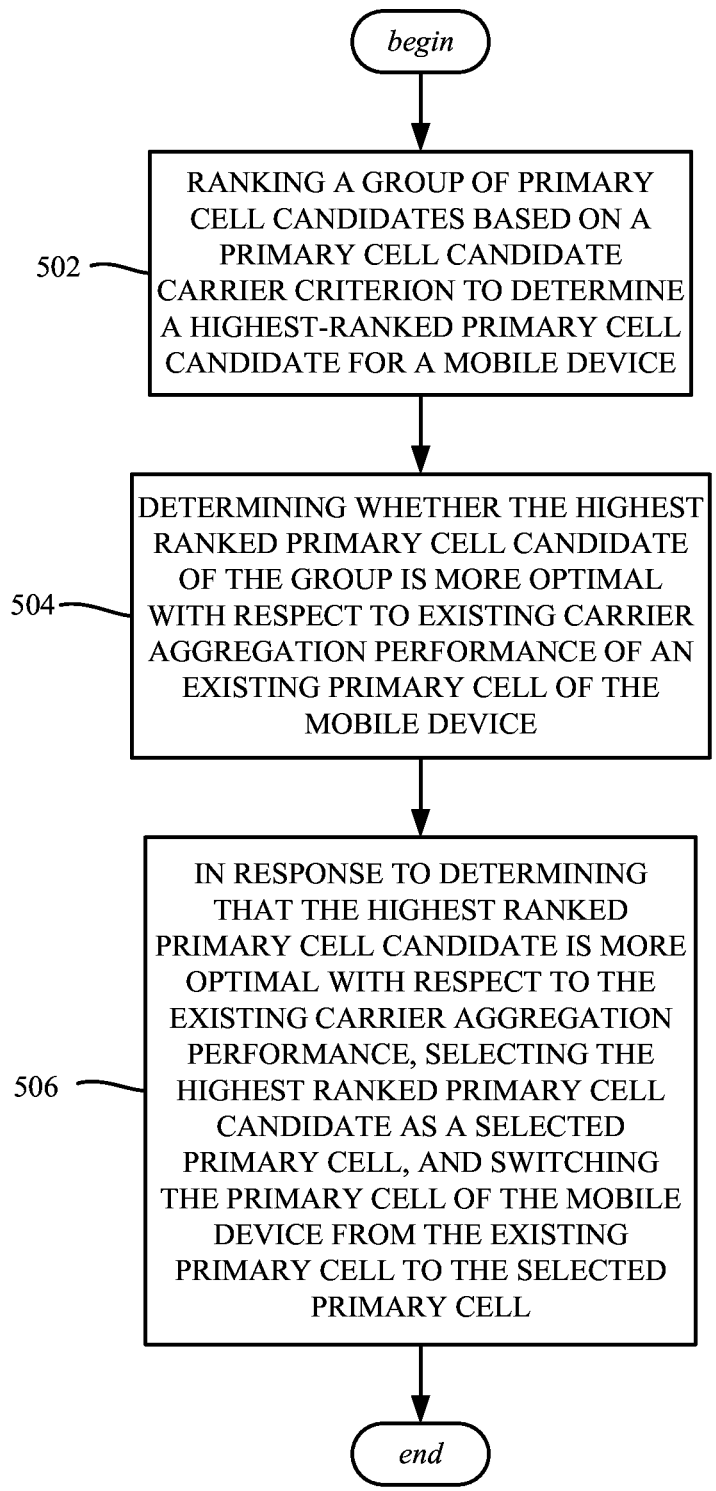
FIG. 5 is a flow diagram representing example operations for ranking primary cell candidates for selecting a higher ranked candidate and switching to use that selected primary cell in carrier aggregation, in accordance with various aspects and embodiments of the subject disclosure.

One or more aspects, such as those implemented in example operations of network equipment comprising a processor and a memory that stores executable instructions that, when executed by the processor, facilitate performance of operations and/or components, or, for example, operations of a method, are shown in FIG. 5 in accordance with various aspects and embodiments of the subject disclosure. Operation 502 represents ranking a group of primary cell candidates based on a primary cell candidate carrier criterion to determine a highest-ranked primary cell candidate for a mobile device. Operation 504 represents determining whether the highest ranked primary cell candidate of the group is more optimal with respect to existing carrier aggregation performance of an existing primary cell of the mobile device. Operation 506 represents, in response to determining that the highest ranked primary cell candidate is more optimal with respect to the existing carrier aggregation performance, selecting the highest ranked primary cell candidate as a selected primary cell, and switching the primary cell of the mobile device from the existing primary cell to the selected primary cell.

Ranking the group of primary cell candidates with respect to the candidate carrier criterion can include ranking based on respective cell carrier bandwidth data of respective primary cell candidates.

Ranking the group of primary cell candidates with respect to the candidate carrier criterion can include ranking based on at least one of: respective cell carrier bandwidth data, respective cell carrier load data, respective cell carrier transport link data, total aggregated bandwidth data, or respective cell carrier radio frequency condition data.

Ranking the group of primary cell candidates with respect to the candidate carrier criterion can include ranking based on whether the respective primary cell candidates are configured for dynamic spectrum sharing.

Ranking the group of primary cell candidates with respect to the candidate carrier criterion can include ranking respective primary cell candidates based on respective backhaul link limitation data.

Ranking the group of primary cell candidates with respect to the candidate carrier criterion can include ranking respective primary cell candidates based on mobile device condition data with respect to the respective primary cell candidates.

Ranking of the group of primary cell candidates with respect to the candidate carrier criterion can include ranking based on mobile device uplink data.

Ranking the group of primary cell candidates with respect to the candidate carrier criterion can include ranking based on at least one of: mobile device uplink signal strength data or uplink signal strength quality data.

Ranking the group of primary cell candidates with respect to the candidate carrier criterion can include ranking based on mobile device downlink data.

Determining whether the highest ranked primary cell candidate of the group is more optimal with respect to the existing carrier aggregation performance can include evaluating layer-2 measurement data.

Determining whether the highest ranked primary cell candidate of the group is more optimal with respect to the existing carrier aggregation performance can include evaluating layer-3 measurement data. Determining whether the highest ranked primary cell candidate of the group is more optimal with respect to the existing carrier aggregation performance can include triggering a layer-3 measurement by the mobile device to obtain the layer-3 measurement data.

Switching the primary cell carrier of the mobile device from the existing primary cell carrier to the selected primary cell carrier can occur within a same site.

Figure 6:
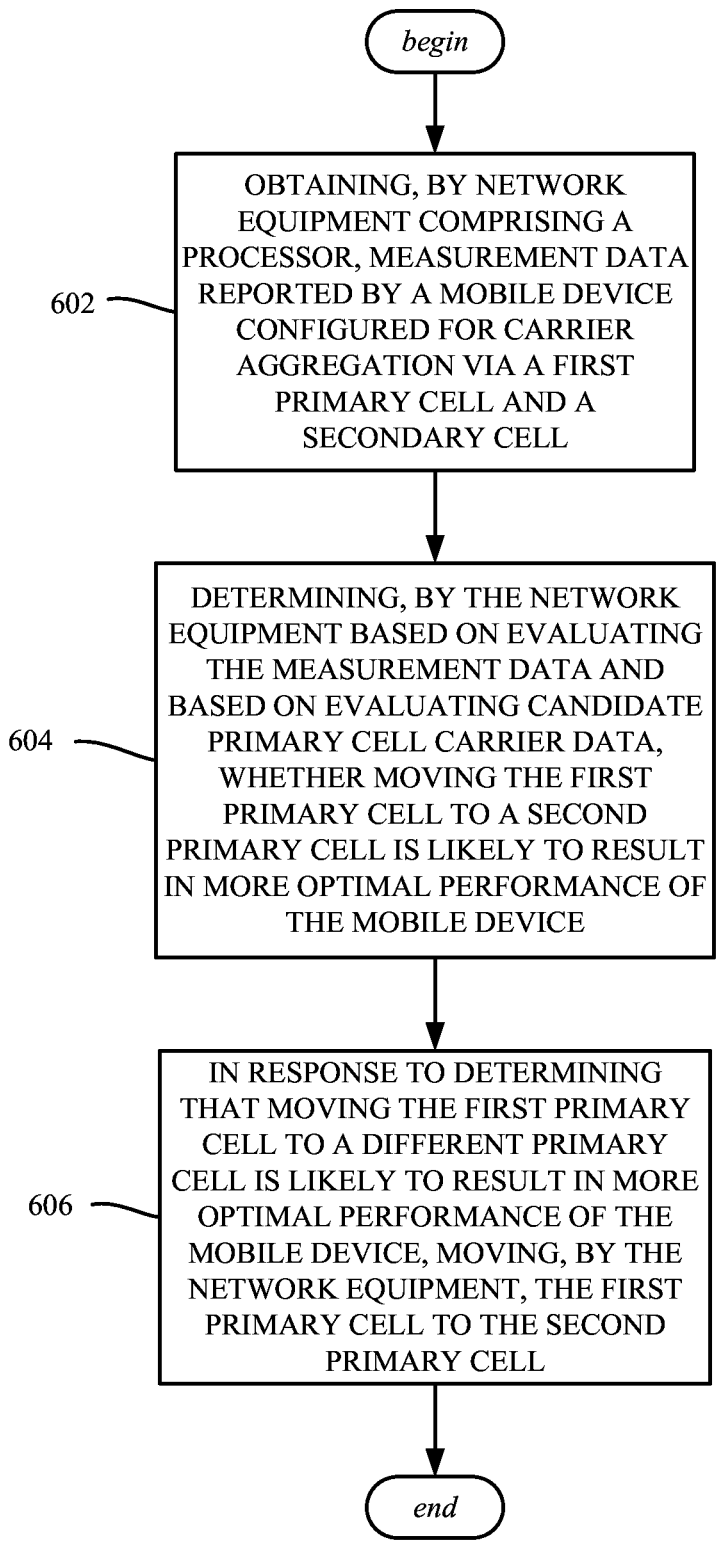
FIG. 6 is a flow diagram representing example operations related to moving to a more optimally performing primary cell based on user equipment measurement data, in accordance with various aspects and embodiments of the subject disclosure.

One or more example aspects are represented in FIG. 6, and can correspond to a method, for example, or a user equipment device comprising a processor and a memory that stores executable instructions that, when executed by the processor, facilitate performance of operations and/or components. Example operations can include operation 602, which represents obtaining, by network equipment comprising a processor, measurement data reported by a mobile device configured for carrier aggregation via a first primary cell and a secondary cell. Operation 604 represents determining, by the network equipment based on evaluating the measurement data and based on evaluating candidate primary cell carrier data, whether moving the first primary cell to a second primary cell is likely to result in more optimal performance of the mobile device. Operation 606 represents, in response to determining that moving the first primary cell to a different primary cell is likely to result in more optimal performance of the mobile device, moving, by the network equipment, the first primary cell to the second primary cell.

Evaluating the candidate primary cell carrier data can include evaluating least one of: carrier bandwidth data, carrier dynamic spectrum sharing data, carrier loading data, carrier backhaul link data, or multiple-input multiple-output antenna data.

Evaluating of the candidate primary cell carrier data can include evaluating, at least one of: mobile device condition data, or mobile device communications data.

Obtaining the measurement data can include triggering, by the by the network equipment, a measurement report from the mobile device.

Figure 7:
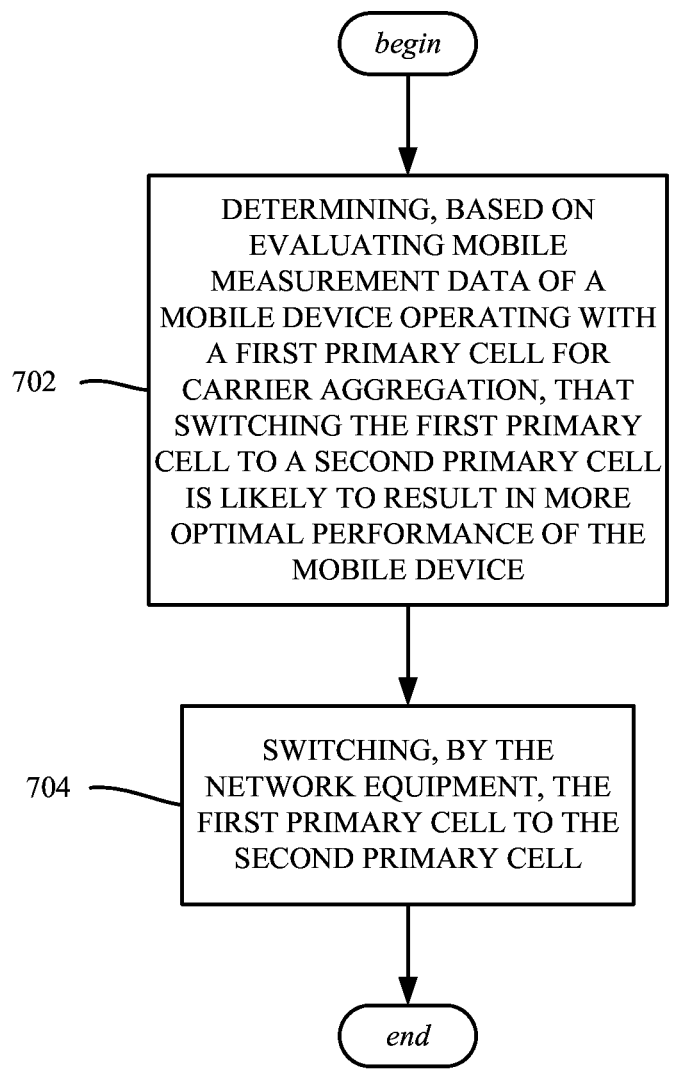
FIG. 7 is a flow diagram representing example operations related to switching a first primary cell to a second primary cell based on evaluating measurement data of a mobile device, in accordance with various aspects and embodiments of the subject disclosure.

One or more aspects, such as implemented in a machine-readable storage medium, comprising executable instructions that, when executed by a processor of network equipment, facilitate performance of operations, are represented in FIG. 7. Example operations comprise operation 702, which represents determining, based on evaluating mobile measurement data of a mobile device operating with a first primary cell for carrier aggregation, that switching the first primary cell to a second primary cell is likely to result in more optimal performance of the mobile device. Example operation 704 represents switching, by the network equipment, the first primary cell to the second primary cell.

The second primary cell can be part of a group of candidate primary cells, and further operations can include selecting the second primary cell from the group based on a ranking of the group of candidate primary cells according to at least one candidate carrier criterion.

Ranking of the group of candidate primary cells according to the at least one candidate carrier criterion can include ranking the group of candidate primary cells by respective carrier bandwidth data of the respective candidate primary cells.

As can be seen, the technology described herein for PCell selection facilitates improved throughput performance at cell center, improved coverage at the cell edge improved uplink throughput based on cell loading and capacity, and, in general, an improved the perceived user experience. Benefits for handling mobility, include, but are not limited to, reducing the number of layer-3 radio resource control signaling operations during mobility, and reducing the impact of inter-frequency gap measurements. This in part is based on more accurate measurement data for both uplink and downlink, via PCell and SCell using layer-1 (PHY) and layer-2 (MAC) measurements, providing an overall evaluation of the source and target cells, before triggering mobility, to avoid ping-pong conditions. The technology described herein can consider the UE power level, heat mitigation, application and/or gNB load conditions, the FDD carrier deployment status (clean carrier vs. DSS), the advanced technology available (or) at the carrier, the RF condition, and transport link data.

Figure 8:
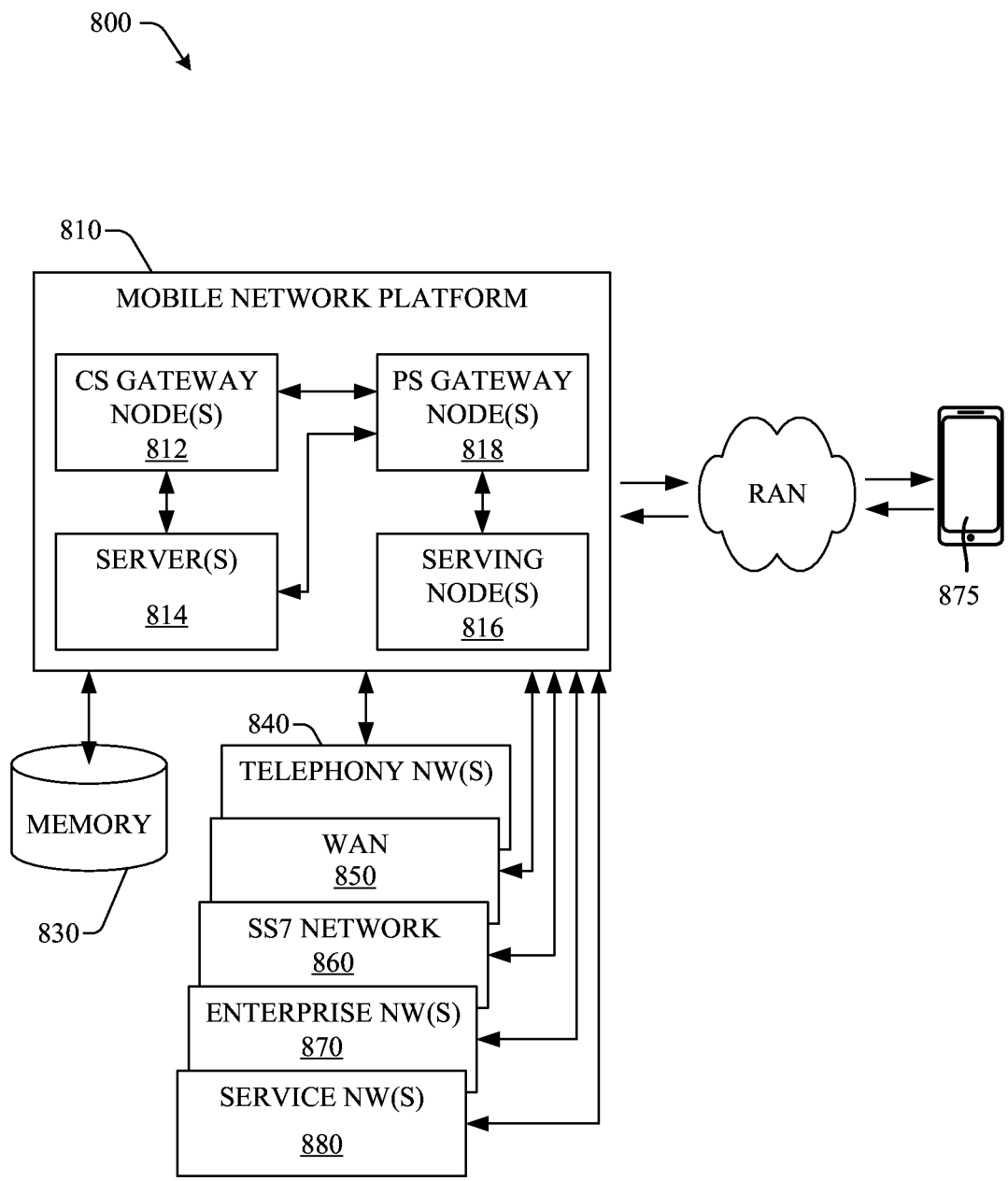
FIG. 8 illustrates an example block diagram of a non-limiting embodiment of a mobile network platform in accordance with various aspects and embodiments of the subject disclosure.

FIG. 8 presents an example embodiment 800 of a mobile network platform 810 that can implement and exploit one or more aspects of the disclosed subject matter described herein. Generally, wireless network platform 810 can include components, e.g., nodes, gateways, interfaces, servers, or disparate platforms, that facilitate both packet-switched (PS) (e.g., internet protocol (IP), frame relay, asynchronous transfer mode (ATM) and circuit-switched (CS) traffic (e.g., voice and data), as well as control generation for networked wireless telecommunication. As a non-limiting example, wireless network platform 810 can be included in telecommunications carrier networks, and can be considered carrier-side components as discussed elsewhere herein. Mobile network platform 810 includes CS gateway node(s) 812 which can interface CS traffic received from legacy networks like telephony network(s) 840 (e.g., public switched telephone network (PSTN), or public land mobile network (PLMN)) or a signaling system #7 (SS7) network 860. Circuit switched gateway node(s) 812 can authorize and authenticate traffic (e.g., voice) arising from such networks. Additionally, CS gateway node(s) 812 can access mobility, or roaming, data generated through SS7 network 860; for instance, mobility data stored in a visited location register (VLR), which can reside in memory 830. Moreover, CS gateway node(s) 812 interfaces CS-based traffic and signaling and PS gateway node(s) 818. As an example, in a 3GPP UMTS network, CS gateway node(s) 812 can be realized at least in part in gateway GPRS support node(s) (GGSN). It should be appreciated that functionality and specific operation of CS gateway node(s) 812, PS gateway node(s) 818, and serving node(s) 816, is provided and dictated by radio technology(ies) utilized by mobile network platform 810 for telecommunication. Mobile network platform 810 can also include the MMEs, HSS/PCRFs, SGWs, and PGWs disclosed herein.

In addition to receiving and processing CS-switched traffic and signaling, PS gateway node(s) 818 can authorize and authenticate PS-based data sessions with served mobile devices. Data sessions can include traffic, or content(s), exchanged with networks external to the wireless network platform 810, like wide area network(s) (WANs) 850, enterprise network(s) 870, and service network(s) 880, which can be embodied in local area network(s) (LANs), can also be interfaced with mobile network platform 810 through PS gateway node(s) 818. It is to be noted that WANs 850 and enterprise network(s) 870 can embody, at least in part, a service network(s) like IP multimedia subsystem (IMS). Based on radio technology layer(s) available in technology resource(s) 817, packet-switched gateway node(s) 818 can generate packet data protocol contexts when a data session is established; other data structures that facilitate routing of packetized data also can be generated. To that end, in an aspect, PS gateway node(s) 818 can include a tunnel interface (e.g., tunnel termination gateway (TTG) in 3GPP UMTS network(s) (not shown)) which can facilitate packetized communication with disparate wireless network(s), such as Wi-Fi networks.

In embodiment 800, wireless network platform 810 also includes serving node(s) 816 that, based upon available radio technology layer(s) within technology resource(s) 817, convey the various packetized flows of data streams received through PS gateway node(s) 818. It is to be noted that for technology resource(s) 817 that rely primarily on CS communication, server node(s) can deliver traffic without reliance on PS gateway node(s) 818; for example, server node(s) can embody at least in part a mobile switching center. As an example, in a 3GPP UMTS network, serving node(s) 816 can be embodied in serving GPRS support node(s) (SGSN).

For radio technologies that exploit packetized communication, server(s) 814 in wireless network platform 810 can execute numerous applications that can generate multiple disparate packetized data streams or flows, and manage (e.g., schedule, queue, format . . . ) such flows. Such application(s) can include add-on features to standard services (for example, provisioning, billing, customer support . . . ) provided by wireless network platform 810. Data streams (e.g., content(s) that are part of a voice call or data session) can be conveyed to PS gateway node(s) 818 for authorization/authentication and initiation of a data session, and to serving node(s) 816 for communication thereafter. In addition to application server, server(s) 814 can include utility server(s), a utility server can include a provisioning server, an operations and maintenance server, a security server that can implement at least in part a certificate authority and firewalls as well as other security mechanisms, and the like. In an aspect, security server(s) secure communication served through wireless network platform 810 to ensure network's operation and data integrity in addition to authorization and authentication procedures that CS gateway node(s) 812 and PS gateway node(s) 818 can enact. Moreover, provisioning server(s) can provision services from external network(s) like networks operated by a disparate service provider; for instance, WAN 850 or Global Positioning System (GPS) network(s) (not shown). Provisioning server(s) can also provision coverage through networks associated to wireless network platform 810 (e.g., deployed and operated by the same service provider), such as femto-cell network(s) (not shown) that enhance wireless service coverage within indoor confined spaces and offload RAN resources in order to enhance subscriber service experience within a home or business environment by way of UE 875.

It is to be noted that server(s) 814 can include one or more processors configured to confer at least in part the functionality of macro network platform 810. To that end, the one or more processor can execute code instructions stored in memory 830, for example. It is should be appreciated that server(s) 814 can include a content manager 815, which operates in substantially the same manner as described hereinbefore.

In example embodiment 800, memory 830 can store information related to operation of wireless network platform 810. Other operational information can include provisioning information of mobile devices served through wireless platform network 810, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 830 can also store information from at least one of telephony network(s) 840, WAN 850, enterprise network(s) 870, or SS7 network 860. In an aspect, memory 830 can be, for example, accessed as part of a data store component or as a remotely connected memory store.

Figure 9:
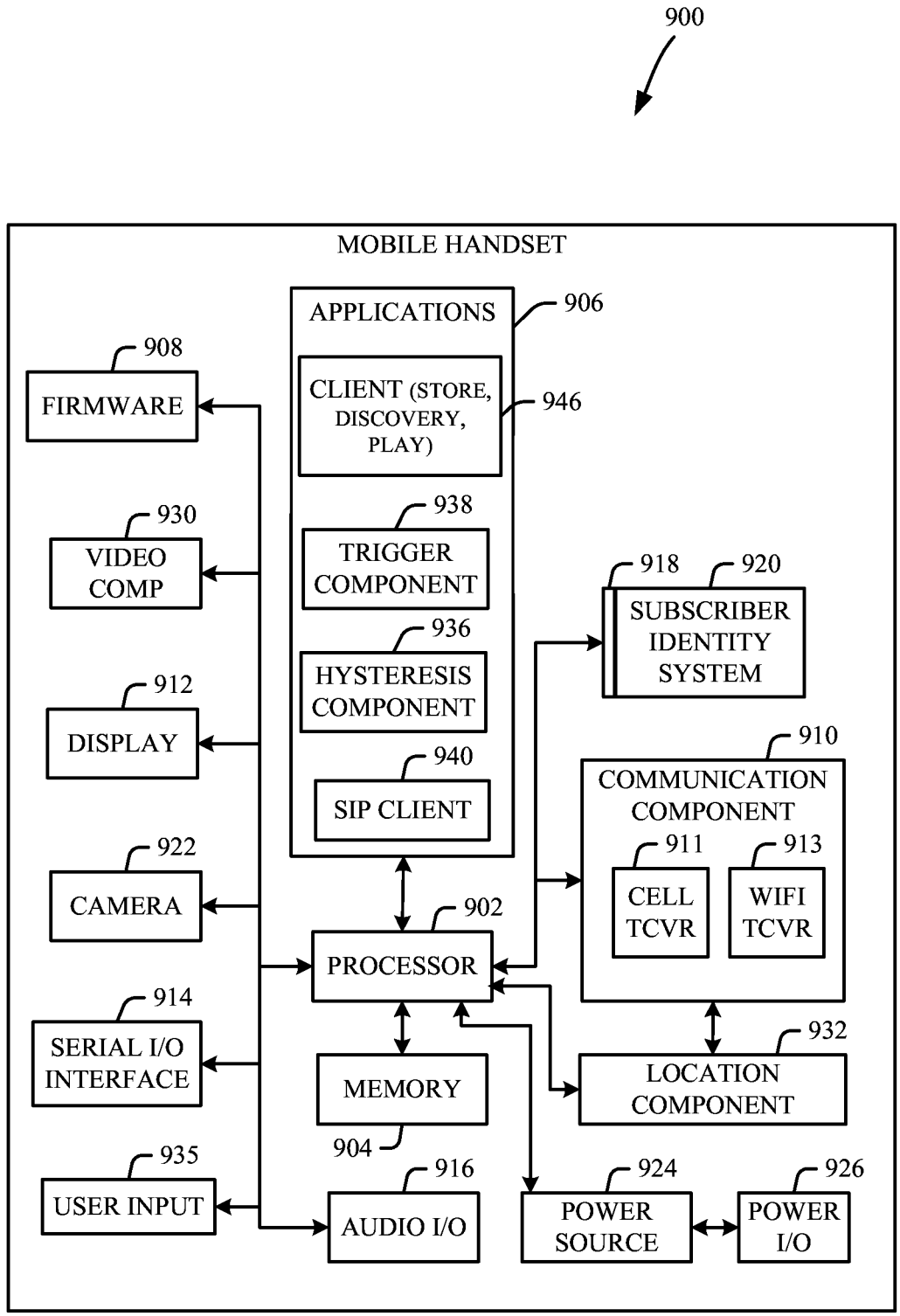
FIG. 9 illustrates an example block diagram of an example mobile handset operable to engage in a system architecture that facilitates wireless communications according to one or more embodiments described herein.

Referring now to FIG. 9, illustrated is a schematic block diagram of an example end-user device such as a user equipment) that can be a mobile device 900 capable of connecting to a network in accordance with some embodiments described herein. Although a mobile handset 900 is illustrated herein, it will be understood that other devices can be a mobile device, and that the mobile handset 900 is merely illustrated to provide context for the embodiments of the various embodiments described herein. The following discussion is intended to provide a brief, general description of an example of a suitable environment 900 in which the various embodiments can be implemented. While the description includes a general context of computer-executable instructions embodied on a machine-readable storage medium, those skilled in the art will recognize that the various embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 900 includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks.

The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1394) through a hardwire connection, and other serial input devices (e.g., a keyboard, keypad, and mouse). This supports updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communication component 910 to accommodate IP traffic from an IP network such as, for example, the Internet, a corporate intranet, a home network, a person area network, etc., through an ISP or broadband cable provider. Thus, VoIP traffic can be utilized by the handset 800 and IP-based multimedia content can be received in either an encoded or decoded format.

A video processing component 922 (e.g., a camera) can be provided for decoding encoded multimedia content. The video processing component 922 can aid in facilitating the generation, editing and sharing of video quotes. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touch screen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 938 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 810, includes an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

Figure 10:
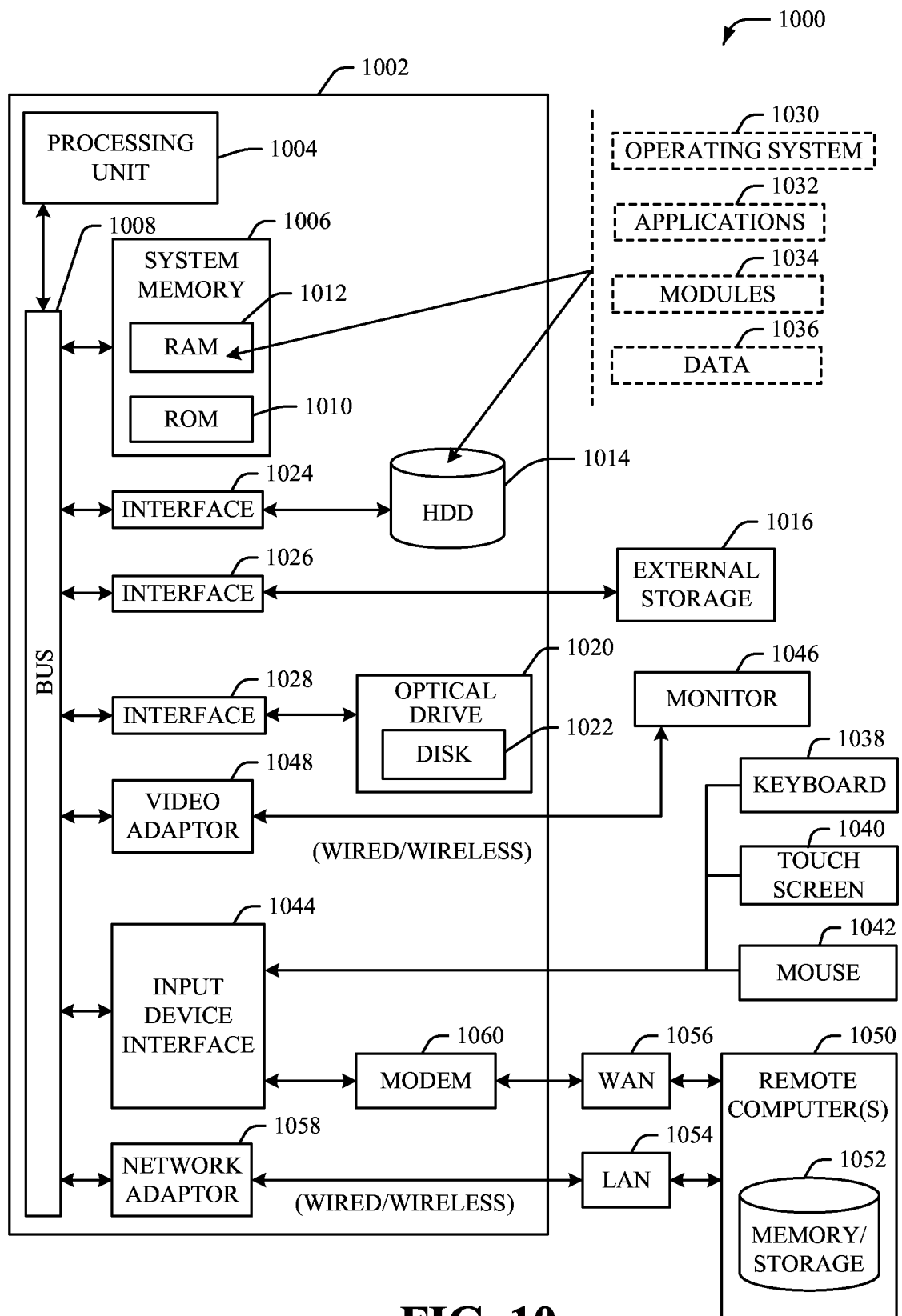
FIG. 10 illustrates an example block diagram of an example computer/machine system operable to engage in a system architecture that facilitates wireless communications according to one or more embodiments described herein.

Referring now to FIG. 10, there is illustrated a block diagram of a computer 1000 operable to execute the functions and operations performed in the described example embodiments. For example, a network node (e.g., network device 104) may contain components as described in FIG. 10. The computer 1000 can provide networking and communication capabilities between a wired or wireless communication network and a server and/or communication device. In order to provide additional context for various aspects thereof, FIG. 1 and the following discussion are intended to provide a brief, general description of a suitable computing environment in which the various aspects of the embodiments can be implemented to facilitate the establishment of a transaction between an entity and a third party. While the description above is in the general context of computer-executable instructions that can run on one or more computers, those skilled in the art will recognize that the various embodiments also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the various embodiments can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 10, implementing various aspects described herein with regards to the end-user device can include a computer 1000, the computer 1000 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes read-only memory (ROM) 1027 and random access memory (RAM) 1012. A basic input/output system (BIOS) is stored in a non-volatile memory 1027 such as ROM, EPROM, EEPROM, which BIOS contains the basic routines that help to transfer information between elements within the computer 1000, such as during start-up. The RAM 1012 can also include a high-speed RAM such as static RAM for caching data.

The computer 1000 further includes an internal hard disk drive (HDD) 1014 (e.g., EIDE, SATA), which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies. Other external drive connection technologies are within contemplation of the subject embodiments.

The drives and their associated computer-readable media provide nonvolatile storage of data, data structures, computer-executable instructions, and so forth. For the computer 1000 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1000, such as zip drives, magnetic cassettes, flash memory cards, cartridges, and the like, can also be used in the example operating environment, and further, that any such media can contain computer-executable instructions for performing the methods of the disclosed embodiments.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is to be appreciated that the various embodiments can be implemented with various commercially available operating systems or combinations of operating systems.

A user can enter commands and information into the computer 1000 through one or more wired/wireless input devices, e.g., a keyboard 1038 and a pointing device, such as a mouse 1040. Other input devices (not shown) may include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc.

A monitor 1044 or other type of display device is also connected to the system bus 1008 through an interface, such as a video adapter 1046. In addition to the monitor 1044, a computer 1000 typically includes other peripheral output devices (not shown), such as speakers, printers, etc.

The computer 1000 can operate in a networked environment using logical connections by wired and/or wireless communications to one or more remote computers, such as a remote computer(s) 1048. The remote computer(s) 1048 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which may connect to a global communications network, e.g., the Internet.

When used in a LAN networking environment, the computer 1000 is connected to the local network 1052 through a wired and/or wireless communication network interface or adapter 1056. The adapter 1056 may facilitate wired or wireless communication to the LAN 1052, which may also include a wireless access point disposed thereon for communicating with the wireless adapter 1056.

When used in a WAN networking environment, the computer 1000 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 through the input device interface 1042. In a networked environment, program modules depicted relative to the computer, or portions thereof, can be stored in the remote memory/storage device 1050. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 8 GHz radio bands, at an 10 Mbps (802.11b) or 84 Mbps (802.11a) data rate, for example, or with products that contain both bands (dual band), so the networks can provide real-world performance similar to the basic "10BaseT" wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory. In addition, memory components or memory elements can be removable or stationary. Moreover, memory can be internal or external to a device or component, or removable or stationary. Memory can comprise various types of media that are readable by a computer, such as hard-disc drives, zip drives, magnetic cassettes, flash memory cards or other types of memory cards, cartridges, or the like.

By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments comprise a system as well as a computer-readable medium having computer-executable instructions for performing the acts and/or events of the various methods.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information.

In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communications media comprise wired media, such as a wired network or direct-wired connection, and wireless media such as acoustic, RF, infrared and other wireless media Further, terms like "user equipment," "user device," "mobile device," "mobile," station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

What is claimed is:

1. Network equipment, comprising:
   a processor; and
   a memory that stores executable instructions that, when executed by the processor of the network equipment, facilitate performance of operations, the operations comprising:
   determining a location of a mobile device to be proximate to a center of an existing primary cell or an edge of the existing primary cell within the existing primary cell of the mobile device;
   ranking a group of primary cell candidates based on a primary cell candidate carrier criterion and the location of the mobile device to determine a highest-ranked primary cell candidate for the mobile device;
   determining whether the highest ranked primary cell candidate of the group is more optimal with respect to existing carrier aggregation performance of an existing primary cell of the mobile device; and
   in response to determining that the highest ranked primary cell candidate is more optimal with respect to the existing carrier aggregation performance and the determined location of the mobile device, selecting the highest ranked primary cell candidate as a selected primary cell, and switching a primary cell of the mobile device from the existing primary cell to the selected primary cell.

2. The network equipment of claim 1, wherein the ranking of the group of primary cell candidates with respect to the primary cell candidate carrier criterion comprises ranking based on respective cell carrier bandwidth data of respective primary cell candidates.

3. The network equipment of claim 1, wherein the ranking of the group of primary cell candidates with respect to the primary cell candidate carrier criterion comprises ranking based on at least one of: respective cell carrier bandwidth data, respective cell carrier load data, respective cell carrier transport link data, total aggregated bandwidth data, or respective cell carrier radio frequency condition data.

4. The network equipment of claim 1, wherein the ranking of the group of primary cell candidates with respect to the primary cell candidate carrier criterion comprises ranking based on whether respective primary cell candidates are configured for dynamic spectrum sharing.

5. The network equipment of claim 1, wherein the ranking of the group of primary cell candidates with respect to the primary cell candidate carrier criterion comprises ranking respective primary cell candidates based on respective backhaul link limitation data.

6. The network equipment of claim 1, wherein the ranking of the group of primary cell candidates with respect to the primary cell candidate carrier criterion comprises ranking respective primary cell candidates based on mobile device condition data with respect to the respective primary cell candidates.

7. The network equipment of claim 1, wherein the ranking of the group of primary cell candidates with respect to the primary cell candidate carrier criterion comprises ranking based on mobile device uplink data.

8. The network equipment of claim 1, wherein the ranking of the group of primary cell candidates with respect to the primary cell candidate carrier criterion comprises ranking based on at least one of: mobile device uplink signal strength data or uplink signal strength quality data.

9. The network equipment of claim 1, wherein the ranking of the group of primary cell candidates with respect to the primary cell candidate carrier criterion comprises ranking based on mobile device downlink data.

10. The network equipment of claim 1, wherein the determining whether the highest ranked primary cell candidate of the group is more optimal with respect to the existing carrier aggregation performance comprises evaluating layer-2 measurement data.

11. The network equipment of claim 1, wherein the determining whether the highest ranked primary cell candidate of the group is more optimal with respect to the existing carrier aggregation performance comprises evaluating layer-3 measurement data.

12. The network equipment of claim 11, wherein the determining whether the highest ranked primary cell candidate of the group is more optimal with respect to the existing carrier aggregation performance comprises triggering a layer-3 measurement by the mobile device to obtain the layer-3 measurement data.

13. The network equipment of claim 1, wherein the switching the primary cell of the mobile device from the existing primary cell to the selected primary cell occurs within a same site.

14. A method, comprising:
   determining, by network equipment comprising a processor, a location of a mobile device to be proximate to a center of a first primary cell or an edge of the first primary cell within the first primary cell of the mobile device;
   obtaining, by the network equipment, measurement data reported by the mobile device configured for carrier aggregation via the first primary cell and a secondary cell;
   determining, by the network equipment based on evaluating the measurement data and the location of the mobile device, and based on evaluating candidate primary cell carrier data, whether moving the first primary cell to a second primary cell is likely to result in more optimal performance of the mobile device; and in response to determining that moving the first primary cell to a different primary cell is likely to result in more optimal performance of the mobile device, moving, by the network equipment, the first primary cell to the second primary cell.

15. The method of claim 14, wherein the evaluating of the candidate primary cell carrier data comprises evaluating least one of: carrier bandwidth data, carrier dynamic spectrum sharing data, carrier loading data, carrier backhaul link data, or multiple-input multiple-output antenna data.

16. The method of claim 14, wherein the evaluating of the candidate primary cell carrier data comprises evaluating, at least one of: mobile device condition data, or mobile device communications data.

17. The method of claim 14, wherein the obtaining the measurement data comprises triggering, by the network equipment, a measurement report from the mobile device.

18. A non-transitory machine-readable medium, comprising executable instructions that, when executed by a processor of network equipment, facilitate performance of operations, the operations comprising:

determining a location of a mobile device to be proximate to a center of a first primary cell or an edge of the first primary cell within the first primary cell of the mobile device;

determining, based on the determined location of the mobile device and evaluating mobile measurement data of the mobile device operating with the first primary cell for carrier aggregation, that switching the first primary cell to a second primary cell is likely to result in more optimal performance of the mobile device; and switching, by the network equipment, the first primary cell to the second primary cell.

19. The non-transitory machine-readable medium of claim 18, wherein the second primary cell is part of a group of candidate primary cells, and wherein the operations further comprise selecting the second primary cell from the group based on a ranking of the group of candidate primary cells according to at least one candidate carrier criterion.

20. The non-transitory machine-readable medium of claim 19, wherein the ranking of the group of candidate primary cells according to the at least one candidate carrier criterion comprises ranking the group of candidate primary cells by respective carrier bandwidth data of respective candidate primary cells.

* * * * *